(12) United States Patent
De Mattia et al.

(10) Patent No.: US 9,931,824 B2
(45) Date of Patent: Apr. 3, 2018

(54) METHOD FOR LAYING UP A TAPE OF MATERIAL AND DEVICE FOR IMPLEMENTING SAME

(71) Applicant: Airbus Operations S.A.S., Toulouse (FR)

(72) Inventors: Denis De Mattia, Basse Goulaine (FR); Bruno Burel, Reze (FR)

(73) Assignee: Airbus Operations S.A.S. (FR)

( * ) Notice: Subject to any disclaimer, the term of this patent is extended or adjusted under 35 U.S.C. 154(b) by 114 days.

(21) Appl. No.: 15/045,453

(22) Filed: Feb. 17, 2016

(65) Prior Publication Data
US 2016/0250836 A1     Sep. 1, 2016

(30) Foreign Application Priority Data
Feb. 27, 2015   (FR) ...................................... 15 51685

(51) Int. Cl.
| | | |
|---|---|---|
| *B44C 1/165* | (2006.01) | |
| *B44C 1/17* | (2006.01) | |
| *B29C 65/50* | (2006.01) | |
| *B32B 37/10* | (2006.01) | |
| *B32B 37/12* | (2006.01) | |
| *B32B 38/04* | (2006.01) | |
| *B32B 38/10* | (2006.01) | |
| *B32B 43/00* | (2006.01) | |

(Continued)

(52) U.S. Cl.
CPC ............ *B32B 37/10* (2013.01); *B29C 70/384* (2013.01); *B29C 70/388* (2013.01); *B32B 37/0053* (2013.01); *B32B 37/12* (2013.01); *B32B 38/10* (2013.01)

(58) Field of Classification Search
USPC ....... 156/230, 238, 247, 249, 250, 256, 258, 156/267
See application file for complete search history.

(56) References Cited

U.S. PATENT DOCUMENTS 4,842,684 A * 6/1989 Tillement ................ B29C 41/12
156/247
5,397,415 A * 3/1995 Manabe .................... B26D 3/08
156/234

(Continued)

FOREIGN PATENT DOCUMENTS

DE      10 2012 017594 A1     3/2014

OTHER PUBLICATIONS

Machine translation of DE 102012017594 (Aug. 4, 2017).*
Search Report dated Jan. 5, 2016 (FR 15 51685).

*Primary Examiner* — Sing P Chan
(74) *Attorney, Agent, or Firm* — Lerner, David, Littenberg, Krumholz & Mentlik, LLP

(57) ABSTRACT

A method of laying up a segment on a layup surface using a layup head that is mobile with respect to the layup surface, the layup head supporting a spool of a tape of material which includes at least one layer to be laid up from which said segment is cut and at least one interliner, the method including applying the tape of material against the layup surface and removing the interliner using a separator. The tape of material is pressed firmly by a press roller against the layup surface before the interliner is removed as the layup head moves in an advancing movement. A layup head for implementing the method and a layup machine including the layup head are also described.

13 Claims, 4 Drawing Sheets

(51) Int. Cl.
*B32B 37/00* (2006.01)
*B29C 70/38* (2006.01)

(56) References Cited

U.S. PATENT DOCUMENTS

2010/0230043 A1* 9/2010 Kisch .................... B29C 70/388
 156/265
2012/0227907 A1 9/2012 Arakawa et al.

* cited by examiner

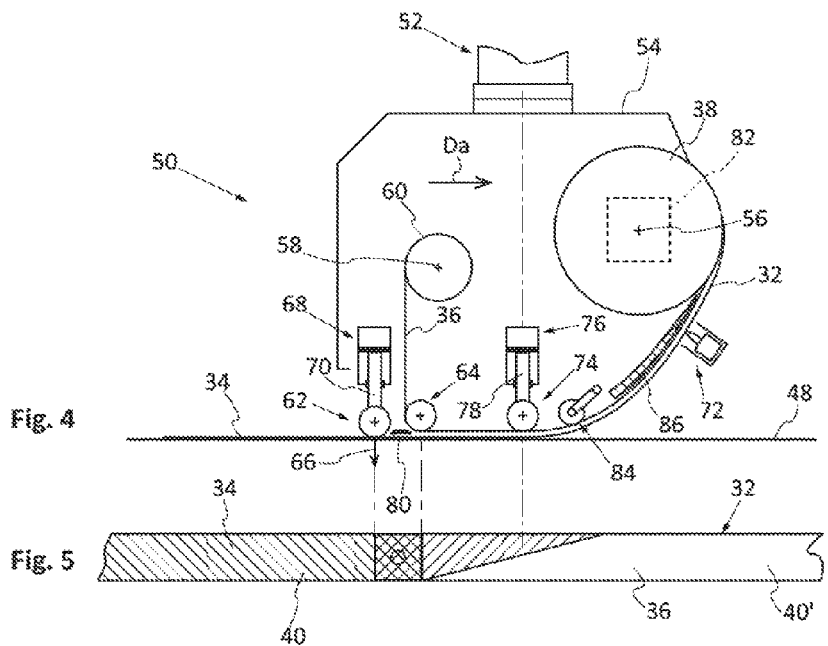
Fig. 4
Fig. 5
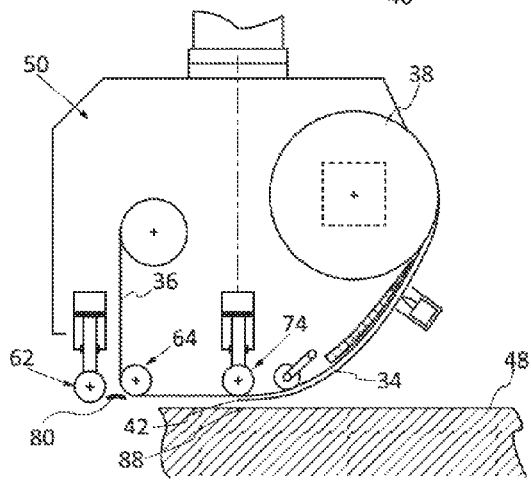
Fig. 6A
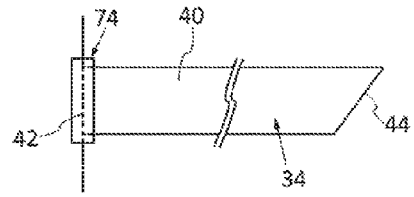
Fig. 7A
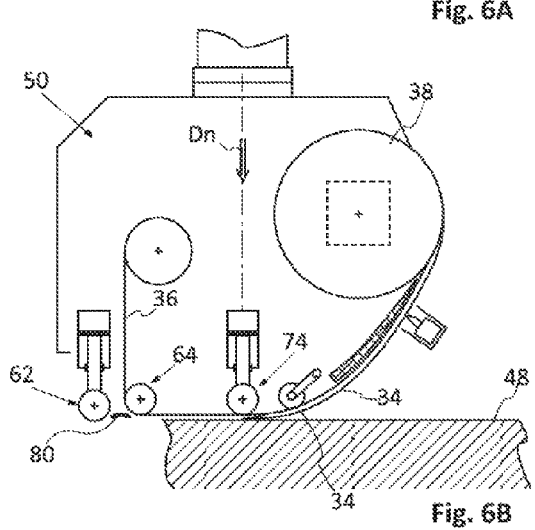
Fig. 6B
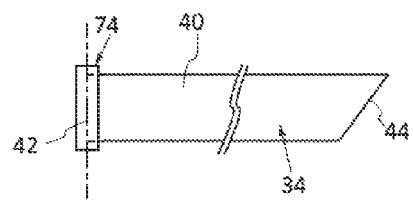
Fig. 7B

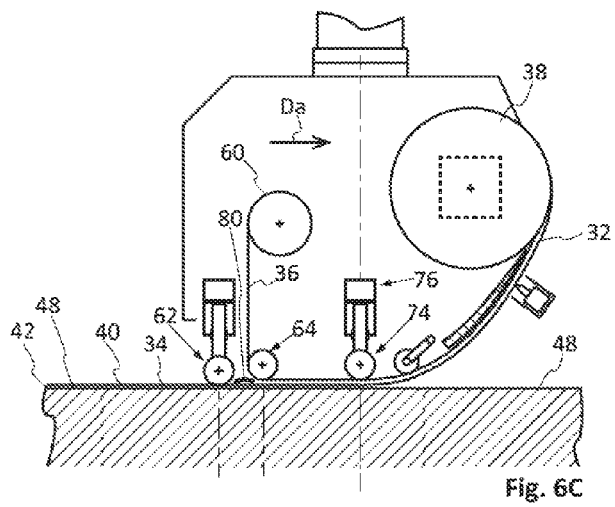
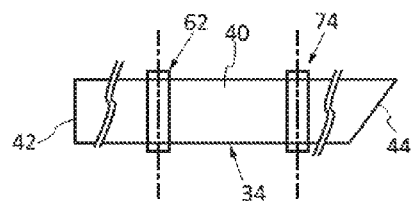
Fig. 7C
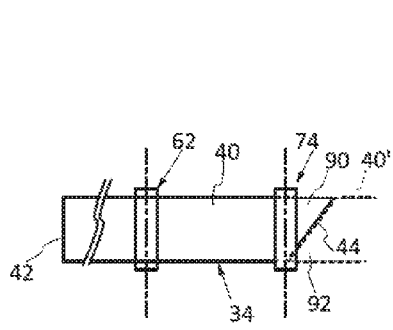
Fig. 7D
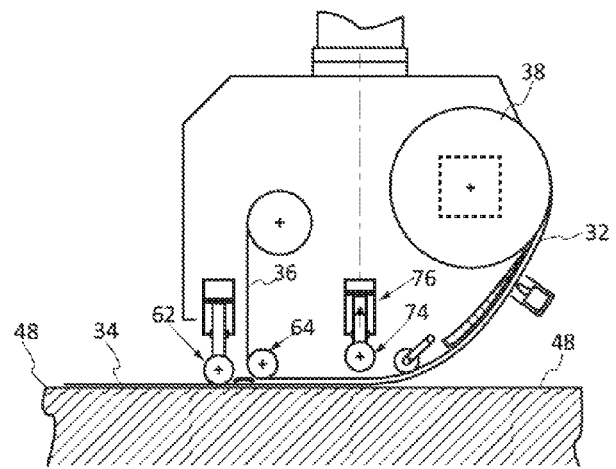

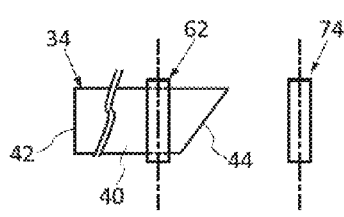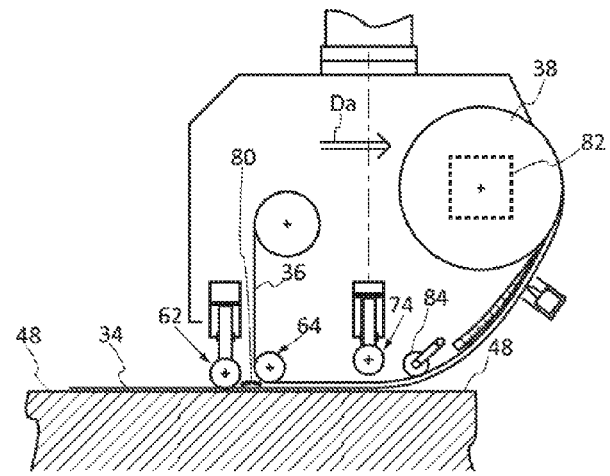
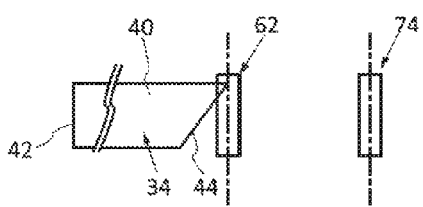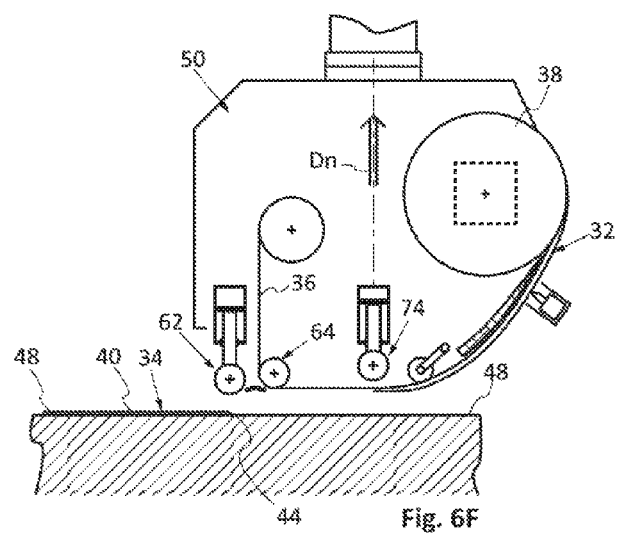

METHOD FOR LAYING UP A TAPE OF MATERIAL AND DEVICE FOR IMPLEMENTING SAME

FIELD OF THE INVENTION

The invention relates to a method for laying up a tape of material which comprises at least one layer to be laid up and at least one interliner, and to a device for implementing same.

BACKGROUND OF THE INVENTION

In the field of aeronautics, parts made of composite and used to create an aircraft fuselage comprise lightning protection at their exterior surfaces. This lightening protection comprises at least one layer made of a material suited to affording lightening protection, such as, non limitingly, at least one layer of fiber glass fabric and/or a fine metal gauze.

This layer providing lightning protection is obtained by laying up a plurality of segments of tape, in juxtaposed manner, on a layup surface.

According to one way of packaging, the tapes comprise an interliner, for example made of paper, on one of their faces and are stored in spools. They have a given width of the order of 150 mm or 300 mm. These tapes are generally precut to form segments of tape which have a length and cuts at each of their ends that are suited to allowing the various segments of tape to be laid up one after another and/or one beside the next so that they cover the entire exterior surface of the component that is to be produced.

According to one procedure, the various segments of tape are laid up manually by operators on the layup surface which may be the surface of a tool or the surface of the last layer laid. To make the task easier, a laser projection assistance system is used to project the outlines of the various juxtaposed segments onto the layup surface.

This layup operation proves to be difficult to carry out on a layup surface of large surface area, such as a wing panel for example, and/or one which has a significant curvature, such as a fuselage segment for example.

The problem is that, for long length segments, it is essential that they be correctly oriented from the outset otherwise there will be a gap or an overlap with respect to the next segment which will increase as the laying of the segment processes. If the operator attempts to correct the orientation of the segment during the process of laying it up, creases may appear in the segment.

In the case of large surface areas, the operators cannot work ergonomically. In some instances, they are obliged to walk over the layup surface and possibly on the segments already laid up.

In order to create parts made of composite from carbon fiber pre-impregnated with resin, it is known practice to use layup machines for automatically laying up carbon fiber tapes which have been pre-impregnated with resin, packaged in the form of spools with an interliner on one of their faces. According to one embodiment illustrated in FIG. 1, a layup machine comprises a layup head 10 and a mechanism (not depicted) that allows the layup head 10 to be moved with respect to a layup surface 12 in a layup direction embodied by the arrow 14. The layup head 10 comprises a support configured to support a spool 16 from which a tape 18 to be laid up on the layup surface 12 is paid out, a layup roller 20 allowing the tape 18 to be pressed firmly against the layup surface 12. The layup head 10 also comprises a separation roller 22 that allows the interliner 24 to be removed from the tape 18 and a roller 26 that allows the interliner 24 to be stored in the form of a spool. The separation roller 22 is positioned between the spool 16 and the layup roller 20 and allows the interliner 24 to be removed before the tape 18 is compressed between the layup roller 20 and the layup surface 12. Thus, the tape 18 comprises a zone between the separation roller 22 and the layup roller 20 in which there is no interliner 24.

With this embodiment, the combination of the advancing movement of the layup head 10 and the action of compacting the tape 18 performed by the layup roller 20 allows tension to be applied to the tape 18, causing the paying-out from the spool 16.

This type of layup head is perfectly well suited to carbon fiber tapes which have a certain rigidity and good tensile strength.

Because lightning protection tapes do not have the same characteristics as carbon fiber tapes, this type of layup head is not suitable for laying them up automatically on a layup surface, the reasons being as follows:

In the absence of the interliner 24, the lightning protection tapes may deform locally, or even tear in the event of excessive tension. Now, as illustrated in FIG. 1, there is a zone 28 of tape between the separation roller 22 and the layup roller 20 which is separated from the interliner 24 and may undergo excessive tensile loading.

In addition, in the absence of the interliner 24, the lightning protection tape 18 does not have a certain rigidity. As a result, when a segment of the tape is completely separated from the interliner 24, a part 30 of said segment finds itself unsupported ahead of the layup roller 20. Insofar as this part 30 does not have a certain rigidity, it has a tendency to curl on itself ahead of the layup roller 20 and so is not correctly pressed firmly against the layup surface 12, as illustrated in FIG. 2.

BRIEF SUMMARY OF THE INVENTION

Hence, the present invention seeks to overcome the disadvantages of the prior art.

An aspect of the invention relates to a method of laying up a segment on a layup surface using a layup head that is mobile with respect to the layup surface, said layup head supporting a spool of a tape of material which comprises at least one layer to be laid up from which said segment is cut and at least one interliner, said method comprising the steps of applying the tape of material against the layup surface and of removing the interliner using a separator. The method is a method wherein the tape of material is pressed firmly by a press roller against the layup surface before the interliner is removed as the layup head moves in an advancing movement.

This method allows segments of tape to be laid up automatically on a layup surface while at the same time limiting the risks of damage to said segments.

Advantageously, the layer to be laid up is pressed firmly by a compaction roller against the layup surface after the interliner has been removed.

According to another feature, when the segment to be laid up and a following segment are configured in such a way as to be able to be in contact simultaneously with the press roller, the press roller is moved away from the layup surface before coming into contact with the next segment so as no longer to press the tape of material against the layup surface, and the tape of material is paid out from the spool in a manner that is synchronized with the advancing movement of the layup head.

For preference, the separator is positioned just ahead of the compaction roller so that when the segment is completely detached from the interliner, said segment comprises a part situated ahead of the compaction roller with a reduced length.

Advantageously, a shoe is positioned ahead of the compaction roller so that when the segment is completely detached from the interliner, the layer to be laid up does not wrinkle ahead of the compaction roller.

Another aspect of the invention relates to a layup head for implementing the method, said layup head comprising:

a spool of a tape of material which comprises at least one layer to be laid up from which a segment to be laid up on a layup surface is cut and at least one interliner, a separator configured to separate the interliner from the layer to be laid up, the layup head being a head which comprises a press roller positioned between the spool and the separator in a direction of travel of the tape of material and configured to press said tape of material firmly against the layup surface when, in operation, the layup head is moving in an advancing movement.

Advantageously, the layup head comprises a compaction roller positioned after the separator in the direction of travel of the tape of material and configured to press the layer that is to be laid up firmly against the layup surface when, in operation, the layup head is moving in an advancing movement.

For preference, the press roller is able to move between a deployed position in which the press roller is moved closer in operation to the layup surface so as to press the tape of material firmly against said layup surface, and a retracted position in which the press roller is moved further away in operation from the layup surface According to another feature, the layup head comprises a synchronization system configured to synchronize the paying-out of the tape of material with the advancing movement of the layup head in operation.

According to one embodiment, the synchronization system comprises at least one motorized drive to control the rotational movement of the spool and a sensor configured to measure the paying-out of the tape of material.

According to another feature, the separator is positioned just ahead of the compaction roller so that when the segment is completely detached from the interliner, said segment comprises a part situated ahead of the compaction roller with a reduced length.

According to another feature, the layup head comprises a shoe positioned ahead of the compaction roller.

Another aspect of the invention relates a layup machine comprising a layup head according to an embodiment of the invention.

According to one embodiment, the layup machine comprises a tool with a layup surface.

According to one embodiment, the layup machine which comprises a recovery table on which any offcuts may be laid.

BRIEF DESCRIPTION OF THE DRAWINGS

Further features and advantages will become apparent from the following description of the invention, which description is given solely by way of example with reference to the attached drawings in which:

FIG. 4 is a diagram of a layup head illustrating one embodiment of the invention, FIG. 5 is a plan view of a tape of material laid up by the layup head visible in FIG. 4, FIGS. 6A to 6F are diagrams of a layup head illustrating the various steps in laying up a segment of tape, FIGS. 7A to 7F are plan views of the segment of tape laid up by the layup head and illustrating the position of the rollers of the layup head at the various steps illustrated in FIGS. 6A to 6F.

DETAILED DESCRIPTION

Figure 1:
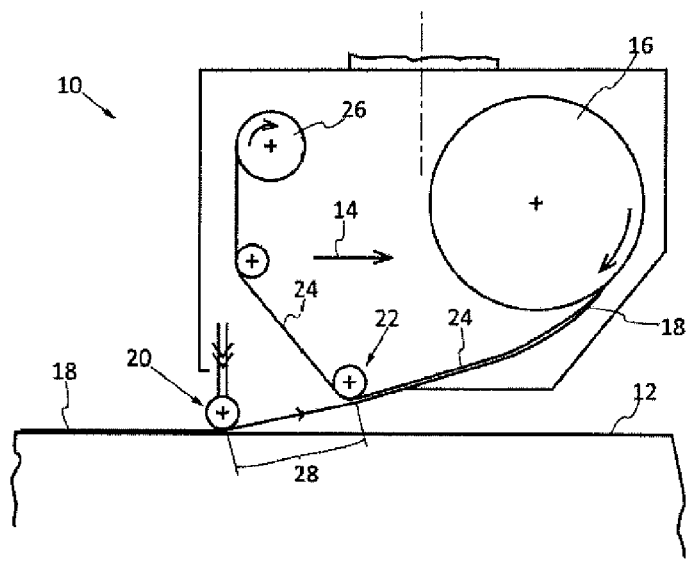
FIG. 1 is a diagram of a layup head illustrating the prior art.
Figure 2:
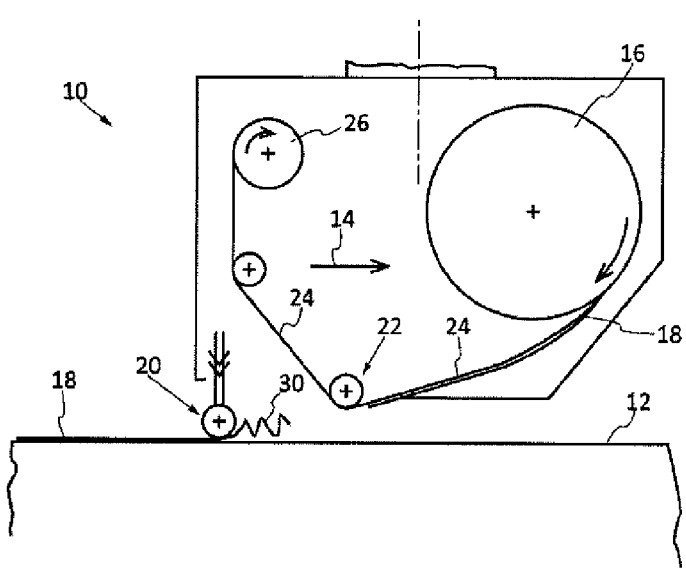
FIG. 2 is a diagram of the layup head of FIG. 1, illustrating the risks of wrinkling of a layer that is to be laid up ahead of a layup roller.
Figure 3:
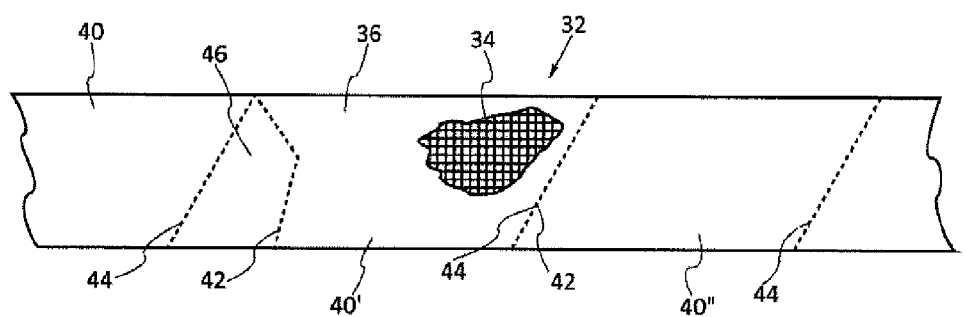
FIG. 3 is a plan view of part of a tape of material with part of an interliner cut away.

FIG. 3 depicts a tape of material 32. This tape of material 32 comprises at least one layer 34 to be laid up and at least one interliner 36 applied against one of the faces of the layer 34 that is to be laid up.

According to one embodiment, the interliner 36 is a backing paper and the layer 34 that is to be laid up is suited to affording lightning protection. By way of example and non limitingly, the layer 34 to be laid up is a layer of fiber glass fabric and/or a fine metal gauze. Whatever the embodiment, the interliner 36 is suited to absorbing tensile load in excess of that which the layer 34 that is to be laid up is capable of absorbing. In addition, the tack between the layer 34 and interliner 36 is lower than that between the layer 34 that is to be laid up and a layup surface. To achieve that, the interliner 36 preferably comprises a non-stick treatment.

According to one embodiment, the layer of material 32 comprises a film applied against the opposite face of the layer 34 that is to be laid up to the interliner 36.

According to one embodiment, the tape of material 32 has a given width of the order of 150 or 300 mm.

The layer 34 and interliner 36 have the same width as the tape of material 32.

According to one type of packaging, the tape of material 32 is packaged in the form of a spool 38 (visible in FIG. 4).

The tape of material 32 is not described further because it is known to those skilled in the art. Thus, the materials of which it is made, and the width thereof may vary from one tape to another.

The tape of material 32 comprises a plurality of segments 40, 40', 40" to be laid up, each of them delimited in the layer 34 that is to be laid up by an upstream cut 42 and a downstream cut 44, the upstream cut 42 being the first to be laid up.

According to a first configuration, for two adjacent segments 40' and 40", the downstream cut 44 of the segment 40' coincides with the upstream cut 42 of the segment 40".

In the second configuration, for two adjacent segments 40 and 40', the downstream cut 44 of the segment 40 is separate from the upstream cut 42 of the segment 40'. In that case, there is a portion of tape referred to as an off cut 46 between the two adjacent segments 40 and 40'.

The segments have lengths and shapes of cut suited to allowing the various segments to be laid up one after another and/or one beside the next so that they cover an entire surface, for example an exterior surface of a component made of composite comprising lightning protection.

According to a first alternative form, the tape of material 32 is precut and the segments are already delimited before the tape of material 32 is packaged in the form of a spool 38.

According to another alternative form, the tape of material 32 is cut at a layup head 50 just before the layer 34 that is to be laid up is laid up onto a layup surface 48.

Advantageously, only the layer 34 that is to be laid up is cut to delimit the segments 40, 40', 40", the interliner 36 remaining continuous over the entire length of the tape of material 32.

According to one application, the layer 34 to be laid up is a lightning protection layer laid up on the exterior surface of a component made of composite forming part of an aircraft fuselage.

According to one procedure, the various layers that form the component made of composite are laid up on a tool the geometry of which is adapted to that of the component that is to be produced and are then consolidated or polymerized in order to obtain a rigid component.

Because the layer 34 that is to be laid up is situated on one of the faces of the component, it is laid up either directly onto the tool or onto the last of the layers. For the remainder of this description, a layup surface 48 corresponds to the surface of a tool or to the surface of a layer already laid up.

FIG. 4 depicts part of a tape layer machine which comprises a layup head 50 supported by a movement mechanism 52 configured to move the layup head 50, notably with respect to the layup surface 48.

According to one embodiment, the movement mechanism 52 is a robotic arm.

The movement mechanism 52 is configured to move the layup head 50 in at least one direction of advance Da parallel to the layup surface 48, in a normal direction Dn (visible in FIG. 6B) perpendicular to the layup surface 48 and/or a combination of these two directions.

The movement mechanism 52 is not described further because it may be identical to those of the prior art.

The layup head 50 comprises:

a chassis 54 connected to the movement mechanism 52, a first spool support 56 connected to the chassis 54 and configured to accept a spool 38 of tape of material 32, a second spool support 58 connected to the chassis 54 and configured to accept a recovery spool 60 for recovering the interliner 36, a first roller 62 connected to the chassis 54 and configured to press the layer 34 that is to be laid up firmly against the layup surface 48, a separator 64 connected to the chassis, positioned between the spool 38 and the first roller 62 and configured to separate the interliner 36 from the rest of the tape of material 32 and direct it towards the recovery spool 60.

The spools 38 and 60 and the first roller 62 are positioned on the chassis in such a way that their axes of rotation are substantially parallel.

The first spool support 56 is positioned at the front of the layup head 50 and the first roller 62 is placed at the rear in the direction of advance Da.

The spool 38 is configured and positioned on the first spool support 56 in such a way that, when the tape of material 32 is paid out, the layer 34 that is to be laid up is positioned between the interliner 36 and the layup surface 48.

According to one embodiment, the separator 64 is a separation roller the axis of rotation of which is substantially parallel to the first roller 62. The separator 64 is fixed relative to the chassis 54 of the layup head 50.

Advantageously, the layup head 50 comprises a means for adjusting the compaction force 66 exerted by the first roller 62 on the layer 34 to be laid up in the direction of the layup surface 48. With this configuration, the first roller 62 is referred to as a compaction roller 62.

According to one embodiment, the layup head 50 comprises a first actuator 68 connected to the chassis 54, said actuator 68 comprising a rod 70 mobile translationally in a direction perpendicular to the layup surface 48 to which the compaction roller 62 is connected.

For preference, the layup head 50 comprises a cutting system 72 configured to at least partially cut the tape of material 32 so as to delimit segments 40, 40', 40" that are to be laid up. Advantageously, the cutting system 72 is configured to cut only the layer 34 that is to be laid up and to delimit within this layer 34 the various segments 40, 40', 40" that are to be laid up, the interliner 36 not being cut and remaining continuous.

According to one embodiment, the cutting system 72 is an ultrasound cutting system connected to the chassis 54 and positioned under the spool 38 at the front of the tape of material 32.

According to one feature of the invention, the layup head 50 comprises a second roller 74 connected to the chassis, positioned between the spool 38 and the separator 64 in the direction of travel of the tape of material and configured to press the tape of material 32 firmly against the layup surface 48 before the interliner 36 is separated from the layer 34 that is to be laid up. Because this second roller 74 is situated ahead of the separator 64, the layer 34 that is to be laid up is never subjected to tensile loading when separated from the interliner 36. Between the spool 38 and the second roller 74, the tape of material 32 is subjected to tensile loading. However, this tensile loading is absorbed by the interliner 36 which is always closely bonded to the layer 34 that is to be laid up.

For preference, the second roller 74 is capable of translational movement between a deployed position in which the second roller 74 is moved closer in operation to the layup surface 48 so as to apply a force pressing the tape of material 32 firmly against the layup surface 48, and a retracted position in which the second roller 74 is moved away from the layup surface 48 and applies no firm pressing force. This configuration makes it possible to lay up segments 40 that have at least one cut to a point.

For the remainder of the description, the second roller 74 is referred to as a press roller 74.

Advantageously, the layup head 50 comprises a second actuator 76, connected to the chassis 54, which supports the press roller 74 to render same mobile. According to one embodiment, the actuator 76 comprises a rod 78 mobile translationally in a direction perpendicular to the layup surface 48 to which the press roller 74 is connected.

For preference, the separator 64 is positioned just ahead of the compaction roller 62 so that it is spaced only a small distance away from said compaction roller 62. As an idea of an order of magnitude, the point of contact of the compaction roller 62 with the layer 34 that is to be laid up and the zone at which said layer 34 is separated from the interliner 36 are separated by a distance of less than 10 cm.

This configuration makes it possible to limit the extent of the portion of segment unsupported ahead of the compaction roller 62 when said segment is completely separated from the interliner 36.

Advantageously, the layup head 50 comprises a shoe 80 positioned between the separator 64 and the compaction roller 62. According to one embodiment, the shoe 80 has a length such that its first end is spaced only a small clearance away from the point of contact of the compaction roller 62 with the layer 34 that is to be laid up and its second end is spaced only a small clearance away from the zone of separation of the layer 34 from the interliner 36. A small clearance here means a clearance of less than 1 cm.

In addition, the shoe 80 is positioned heightwise with respect to the separator 64 in such a way as to be spaced away from the layer 34 that is to be laid up by a clearance of the order of 1 to 4 mm. This configuration makes it possible to prevent wrinkling in the layer 34 that is to be laid up ahead of the compaction roller 62.

The various rollers 62, 64, 74 and the shoe 80 have a width slightly greater than that of the tape of material 32. They are preferably centered with respect to said tape of material 32.

According to another feature of the invention, the layup head 50 comprises a system for synchronizing the payout movement of the spool 38 with the advancing movement of said layup head 50, at least when the press roller 74 is not in contact with the tape of material 32. This configuration makes it possible to prevent the layer 34 that is to be laid up from being subjected to tensile force when the press roller 74 is spaced away from the tape of material for example at the end of the laying-up of a segment that has a pointed end.

This synchronization system comprises at least one motorized drive 82 to control the rotational movement of the spool 38, the rotational movement of said motorized drive being slaved to the advancing movement of the layup head.

For preference, the synchronization system comprises a motorized drive to control the rotational movement of the recovery spool 60, the rotational movement of said motorized drive being slaved to the advancing movement of the layup head.

In order accurately to determine the advancing movement of the layup head 50, the synchronization system preferably comprises a sensor 84 configured to measure the paying out of the tape of material 32 when it is in contact with the layup surface 48 or just before it comes into contact with the layup surface 48. According to one embodiment, this sensor 84 is an encoder wheel in contact with the surface of the tape of material 32 that is covered by the interliner 36. This encoder wheel is connected to the chassis 54 and positioned ahead of the compaction roller 62. In one configuration, the encoder wheel is positioned just ahead of the press roller 74.

For preference, the layup head 50 comprises a guide 86 connected to the chassis 54 and positioned in such a way as to be in contact with that surface of the tape of material 32 that is covered by the interliner 36 and guide said tape of material 32 between the spool 38 and the press roller 74. This guide 86 makes it possible to improve the positioning of the tape of material 32 with respect to the cutting system 72 and/or to the sensor 84.

The layup machine comprises, in addition to the layup head 50, a command/control system which allows control over the movements of the layup head 50 and of the press roller 74, and the compaction force applied by the compaction roller 62. This command/control post also allows control over the rotational movement of the motorized drive 82, as a function of measurements from the sensor 84.

For preference, the layup machine comprises a supporting structure to which a tool with a layup surface the geometry of which is tailored to that of the component that is to be produced and a recovery table on which any off cuts 46 may be laid can be secured removably.

The principle of operation of the layup machine is now described with reference to FIGS. 6A to 6F and 7A to 7F for the laying-up of a segment 40 with an upstream cut 42 and downstream cut 44.

That portion of the upstream cut 42 of the segment 40 that is situated furthest to the rear of the layup head 50 is positioned level with the lower generatrix of the press roller 74, as illustrated in FIGS. 6A and 7A. This upstream cut 42 may have been obtained using the cutting system 72.

The layup head 50 is moved so as to position the upstream cut 42 vertically in line with a mating position 88 which corresponds to the position of the upstream cut 42 on the layup surface 48.

Next, the layup head 50 is moved in the direction Dn in such a way as to grip the tape of material 32 between the press roller 74 and the layup surface 48, as illustrated in FIG. 6B. The position of the layup head 50 with respect to the layup surface 48 is adjusted in such a way that the press roller 74 applies a force of the order of 5 N per mm of width of tape 32.

As illustrated in FIG. 6C, the layup head 50 is moved in the direction of advance Da. During this movement, because the tape of material 32 is pressed firmly against the layup surface 48, the segment 40 of the layer 34 that is to be laid up adheres to the layup surface 48. At the separator 64, the interliner 36 is removed so that it can be wound onto the recovery spool 60. Once it has begun, the separation of the layer 34 and interliner 36 spreads laterally (at right angles to the length of the tape of material 32) and longitudinally (parallel to the length of the tape of material 32) from the initial point of detachment, as the layup head 50 gradually advances.

Behind the separator 64, the compaction roller 62 applies a compaction force to the layer 34 that is to be laid up.

During this phase, the press roller 74, in contact with the interliner 36, firmly presses the tape of material 32 against the layup surface 48. As a result, the tape of material 32, via the layer 34 that is to be laid up, adheres to the layup surface 48. The paying-out of the tape of material 32 is brought about by the combination of the adhesion of the tape of material 32 to the layup surface 48 and of the advancing movement of the layup head 50. The layer 34 that is to be laid up experiences no tensile force, as such force is absorbed by the interliner 36.

Depending on the downstream cut 44, the press roller 74 may be in contact with the segment 40 but also with another segment 40' or with an off cut 46, for example when said segment 40 has a pointed shape 90. As illustrated in FIGS. 6D and 7D, just before reaching this pointed shape 90, the press roller 74 is moved toward the retracted position by the actuator 76. Thus, the press roller 74 is moved a few millimeters away from the layup surface 48 so that the end 92 of the next segment 40' is not pressed firmly against the layup surface 48.

Next, as illustrated in FIG. 6E, the layup head 50 continues its advancing movement to complete the laying-up of the segment 40. As soon as the press roller 74 is no longer in contact with the tape of material 32, the paying-out from the spool 38 is synchronized by the advancing movement of the layup head 50 by the motorized drive 82 and the sensor 84. For preference, the rotational movement of the recovery spool 60 is likewise synchronized with the advancing movement of the layup head. This synchronization avoids any tensile force in the layer 34 that is to be laid up.

The compaction roller 62 applies firm pressure to said layer 34.

Because the separator 64 is spaced only a small distance away from the compaction roller 62, the length of segment 40 situated ahead of the compaction roller 62 is reduced when the segment 40 is completely detached from the interliner 36. As a result, because the unsupporting portion of the segment 40 is short, the risks of it curling up on itself ahead of the compaction roller 62 are limited. Finally, the shoe 80 prevents any risk of curling of said portion on itself.

During this advancing movement, the compaction roller 62 allows the segment 40 to be separated from the interliner 36. The fact of moving the press roller 64 away means that the end of the next segment 40' can be kept still pressed firmly against the interliner 36. This then causes the two segments 40 and 40' to separate.

As illustrated in FIG. 6F, as soon as the entire segment 40 has been pressed firmly against the layup surface 48, the layup head 50 is moved away from the layup surface 48.

The tape of material 32 is wound on so that the upstream cut 42 of the next segment 40' is positioned in vertical alignment with the lower generatrix of the press roller 74. This press roller 74 is repositioned in the deployed position.

It is therefore possible to proceed to layup the next segment 40' as described hereinabove. If the next segment is an offcut 46, the latter is laid onto the recovery table in the same way as the segments that are to be laid up are laid up on the layup surface, the offcut 46 corresponds to a segment that is not to be laid up on the layup surface 48.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A method of laying up a segment on a layup surface using a layup head that is mobile with respect to the layup surface, said layup head supporting a spool of a tape of material which comprises at least one layer to be laid up from which said segment is cut and at least one interliner, the at least one layer having a first surface and a second surface, said method comprising:
    applying the tape of material against the layup surface with the first surface facing the layup surface; and
    removing the interliner using a separator from the second surface to expose the second surface;
    firmly pressing, by a press roller, the tape of material against the layup surface before the interliner is removed as the layup head moves in an advancing movement;
    firmly pressing, by a compaction roller, directly on the exposed second surface of the at least one layer against the layup surface after the interliner has been removed; and
    directing, by the separator, the interliner toward a recovery spool.

2. The method as claimed in claim 1, wherein, when the segment to be laid up and a following segment are configured in such a way as to be able to be in contact simultaneously with the press roller, the press roller is moved away from the layup surface before coming into contact with the next segment so as no longer to press the tape of material against the layup surface, and wherein the tape of material is paid out from the spool in a manner that is synchronized with the advancing movement of the layup head.

3. The method as claimed in claim 1, wherein the separator is positioned just ahead of the compaction roller so that when the segment is completely detached from the interliner, said segment comprises a part situated ahead of the compaction roller with a reduced length.

4. The method as claimed in claim 1, wherein a shoe is positioned ahead of the compaction roller so that when the segment is completely detached from the interliner, the layer to be laid up does not wrinkle ahead of the compaction roller.

5. A layup head for implementing a method of laying up a segment on a layup surface, said layup head comprising:
    a spool of a tape of material comprising at least one layer to be laid up from which a segment to be laid up on a layup surface is cut and at least one interliner;
    a separator configured to separate the interliner from the layer to be laid up to expose a surface of the at least one layer;
    a press roller positioned between the spool and the separator in a direction of travel of the tape of material and configured to press said tape of material firmly against the layup surface when, in operation, the layup head is moving in an advancing movement; and
    a compaction roller positioned after the separator in the direction of travel of the tape of material and configured to directly press on the exposed surface of the at least one layer that is to be laid up firmly against the layup surface when, in operation, the layup head is moving in an advancing movement,
    the separator being configured to direct the interliner toward a recovery spool.

6. The layup head as claimed in claim 5, wherein the press roller is configured to move between a deployed position in which the press roller is moved closer in operation to the layup surface so as to press the tape of material firmly against said layup surface, and a retracted position in which the press roller is moved further away in operation from the layup surface.

7. The layup head as claimed in claim 6, further comprising a synchronization system configured to synchronize the paying-out of the tape of material with the advancing movement of the layup head in operation.

8. The layup head as claimed in claim 7, wherein the synchronization system comprises:
    at least one motorized drive to control the rotational movement of the spool; and
    a sensor configured to measure the paying-out of the tape of material.

9. The layup head as claimed in claim 5, wherein the separator is positioned just ahead of the compaction roller so that when the segment is completely detached from the interliner, said segment comprises a part situated ahead of the compaction roller with a reduced length.

10. The layup head as claimed in claim 5, further comprising a shoe positioned ahead of the compaction roller.

11. A layup machine comprising a layup head comprising:
    a spool of a tape of material comprising at least one layer to be laid up from which a segment to be laid up on a layup surface is cut and at least one interliner;
    a separator configured to separate the interliner from the at least one layer to be laid up to expose a surface of the at least one layer;
    a press roller positioned between the spool and the separator in a direction of travel of the tape of material and configured to press said tape of material firmly against the layup surface when, in operation, the layup head is moving in an advancing movement; and a compaction roller positioned after the separator in the direction of travel of the tape of material and configured to directly press on the exposed surface of the at least one layer that is to be laid up firmly against the layup surface when, in operation, the layup head is moving in an advancing movement, the separator being configured to direct the interliner toward a recovery spool.

12. The layup machine as claimed in claim 11, further comprising a tool with a layup surface.

13. The layup machine as claimed in claim 12, further comprising a recovery table on which any offcuts may be laid.

* * * * *